United States Patent
Konik et al.

(10) Patent No.: US 9,460,192 B2
(45) Date of Patent: Oct. 4, 2016

(54) MANAGEMENT OF A DATABASE SYSTEM

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 14/060,219

(22) Filed: Oct. 22, 2013

(65) Prior Publication Data

US 2014/0324876 A1  Oct. 30, 2014

Related U.S. Application Data

(63) Continuation of application No. 13/870,158, filed on Apr. 25, 2013.

(51) Int. Cl.
*G06F 17/30* (2006.01)

(52) U.S. Cl.
CPC ... *G06F 17/30631* (2013.01); *G06F 17/30312* (2013.01)

(58) Field of Classification Search
CPC .................................................. G06F 17/30631
USPC ........................................................ 707/741
See application file for complete search history.

(56) References Cited

U.S. PATENT DOCUMENTS

| | | | | |
|---|---|---|---|---|
| 6,163,774 A * | 12/2000 | Lore | ...................... | G06Q 10/06 705/36 R |
| 6,285,994 B1 * | 9/2001 | Bui | .................... | G06F 17/30324 707/745 |
| 6,356,888 B1 | 3/2002 | Egan et al. | | |
| 6,397,204 B1 | 5/2002 | Liu et al. | | |
| 6,405,187 B1 * | 6/2002 | Egan | ................. | G06F 17/30321 |
| 6,446,063 B1 * | 9/2002 | Chen | ................. | G06F 17/30466 |
| 6,484,179 B1 * | 11/2002 | Roccaforte | ....... | G06F 17/30592 707/737 |
| 6,507,846 B1 * | 1/2003 | Consens | .......... | G06F 17/30324 |
| 6,725,223 B2 | 4/2004 | Abdo et al. | | |

(Continued)

OTHER PUBLICATIONS

Konik et al., "Management of a Database System," U.S. Appl. No. 13/870,158, filed Apr. 25, 2013.

(Continued)

*Primary Examiner* — Miranda Le
(74) *Attorney, Agent, or Firm* — Feb R. Cabrasawan; Nicholas D. Bowman

(57) ABSTRACT

A method, system, and computer program product to manage a database is disclosed. The method, system, and computer program product may include structuring the database to have a first table having an index and a second table. A first key of the first table may be related to a second key of the second table. The method, system, and computer program product may include creating an entry locator in the index. The method, system, and computer program product may include maintaining an association between the second key of the second table and the entry locator of the index.

3 Claims, 7 Drawing Sheets

(56) References Cited

U.S. PATENT DOCUMENTS

| | | | |
|---|---|---|---|
| 6,778,996 B2* | 8/2004 | Roccaforte | G06F 17/30592 707/600 |
| 6,850,952 B2* | 2/2005 | Tse | G06F 17/30592 |
| 7,117,222 B2* | 10/2006 | Santosuosso | G06F 17/3056 |
| 7,299,243 B2* | 11/2007 | Maxfield | G06F 17/30595 |
| 7,480,662 B2 | 1/2009 | Potapov et al. | |
| 7,792,823 B2* | 9/2010 | Cain | G06F 17/30336 707/715 |
| 7,921,102 B2 | 4/2011 | Cain et al. | |
| 7,966,343 B2 | 6/2011 | Yang et al. | |
| 8,275,761 B2 | 9/2012 | Day et al. | |
| 8,311,975 B1 | 11/2012 | Gonsalves | |
| 8,359,296 B2 | 1/2013 | Santosuosso | |
| 8,468,151 B2 | 6/2013 | Branscome et al. | |
| 8,601,038 B2* | 12/2013 | Plattner | G06Q 10/08 705/330 |
| 8,626,790 B2* | 1/2014 | Potdar | G06F 17/30389 707/776 |
| 8,676,801 B2* | 3/2014 | Gong | G06F 17/30333 707/736 |
| 8,700,679 B2 | 4/2014 | Nagel et al. | |
| 8,737,173 B2 | 5/2014 | Olson | |
| 2003/0033225 A1* | 2/2003 | Meldahl | G06Q 40/02 705/30 |
| 2003/0208503 A1* | 11/2003 | Roccaforte | G06F 17/30592 |
| 2004/0054683 A1* | 3/2004 | Nishizawa | G06F 17/30471 |
| 2005/0076045 A1 | 4/2005 | Stenslet et al. | |
| 2009/0055439 A1* | 2/2009 | Pai | G06F 17/30592 |
| 2009/0182724 A1 | 7/2009 | Day et al. | |
| 2009/0265335 A1* | 10/2009 | Hoffman | G06F 17/30592 |
| 2010/0088309 A1 | 4/2010 | Petculescu et al. | |
| 2010/0299367 A1* | 11/2010 | Chakrabarti | G06F 17/3053 707/803 |
| 2012/0109888 A1* | 5/2012 | Zhang | G06F 17/30584 707/610 |
| 2012/0317095 A1 | 12/2012 | Day et al. | |
| 2014/0095502 A1* | 4/2014 | Ziauddin | G06F 17/30289 707/737 |
| 2014/0172804 A1* | 6/2014 | Kaufmann | G06F 17/30309 707/649 |
| 2014/0188784 A1* | 7/2014 | Guerra | G06F 17/30563 707/602 |
| 2014/0324874 A1 | 10/2014 | Konik et al. | |

OTHER PUBLICATIONS

IBM, "DB2 UDB for iSeries Database Performance and Query Optimization V5R1" iSeries Information Center, http://publib.boulder.ibm.com/iseries/v5r1/ic2924/index.htm?info/rzajq/rzajqmstperf21c.htm.

McKinley, T., "DB2 for IBM i Indexing—The Key to Good Performance" IBM Power Systems, QUSER Apr. 2012. © 2012 IBM Corporation.

Passe et al., "Unleashing SQL Query Performance Through EVIs" IBMSystems Magazine, Sep. 2006. http://www.ibmsystemsmag.com/ibmi/administrator/db2/Unleashing-SQL-Query-Performance-Through-EVIs/?page=2 ©2013 MSP Communications, Inc.

Konik et al., "Management of a Database System", U.S. Appl. No. 15/131,058, filed Apr. 18, 2016.

* cited by examiner

MANAGEMENT OF A DATABASE SYSTEM

CROSS-REFERENCE TO RELATED APPLICATIONS

This application is a continuation of co-pending U.S. patent application Ser. No. 13/870,158 filed Apr. 25, 2013. The aforementioned related patent application is herein incorporated by reference in its entirety.

TECHNICAL FIELD

This disclosure relates generally to computing systems and, more particularly, relates to database management systems.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs may benefit from system resource savings and efficiencies.

SUMMARY

Aspects of the disclosure may include a method, system, and computer program product to manage a database. The method, system, and computer program product may include structuring the database to have a first table having an index and a second table. A first key of the first table may be related to a second key of the second table. The method, system, and computer program product may include creating an entry locator in the index. The method, system, and computer program product may include maintaining an association between the second key of the second table and the entry locator of the index.

Aspects of the disclosure may include a database. The database may include a dimension table and a fact table. The dimension table may have a primary key. The fact table may have a foreign key. An index on the fact table may exist. An entry locator may be created in the index. An association may be maintained between the primary key of the dimension table and the entry locator of the index. Maintaining the association between the primary key of the dimension table and the entry locator of the index may keep the entry locator updated. In embodiments, the association may be maintained in response to maintenance to the dimension table. In embodiments, the association may be maintained in response to a query to the database. In embodiments, the index may be an encoded vector index. In embodiments, the entry locator may be a column of a symbol table. Aspects of the disclosure may save system resources. Less paging of objects may occur. The dimension table may or may not need to be checked regarding the primary key and a change may be made directly to the fact table. Fewer indexes may be created and fewer indexes may need to be maintained. A task may be efficient or perform well because of fewer indexes needing to be accessed for the task.

DETAILED DESCRIPTION

A database administrator may desire to run a query or maintain the database by adding, deleting, or changing a record in the database. Indexes may need to be created, to be maintained, or to perform tasks. The database administrator may have a small temporal window. When associated with a large amount of data, these activities may take an amount of time and performance overhead such as system resources that are not insignificant. It may be desirable to create fewer indexes. It may be desirable to have fewer indexes to maintain. It may be desirable to perform less processing.

Aspects of the disclosure may include a database. The database may include a dimension table and a fact table. The dimension table may have a primary key. The fact table may have a foreign key. An index on the fact table may exist. An entry locator may be created in the index. An association may be maintained between the primary key of the dimension table and the entry locator of the index. Maintaining the association between the primary key of the dimension table and the entry locator of the index may keep the entry locator updated. In embodiments, the association may be maintained in response to maintenance to the dimension table. In embodiments, the association may be maintained in response to a query to the database. In embodiments, the index may be an encoded vector index. In embodiments, the entry locator may be a column of a symbol table. Aspects of the disclosure may save system resources. Less paging of objects may occur. The dimension table may or may not need to be checked regarding the primary key and a change may be made directly to the fact table. Fewer indexes may be created and fewer indexes may need to be maintained. A task may be efficient or perform well because of fewer indexes needing to be accessed for the task.

Figure 1:
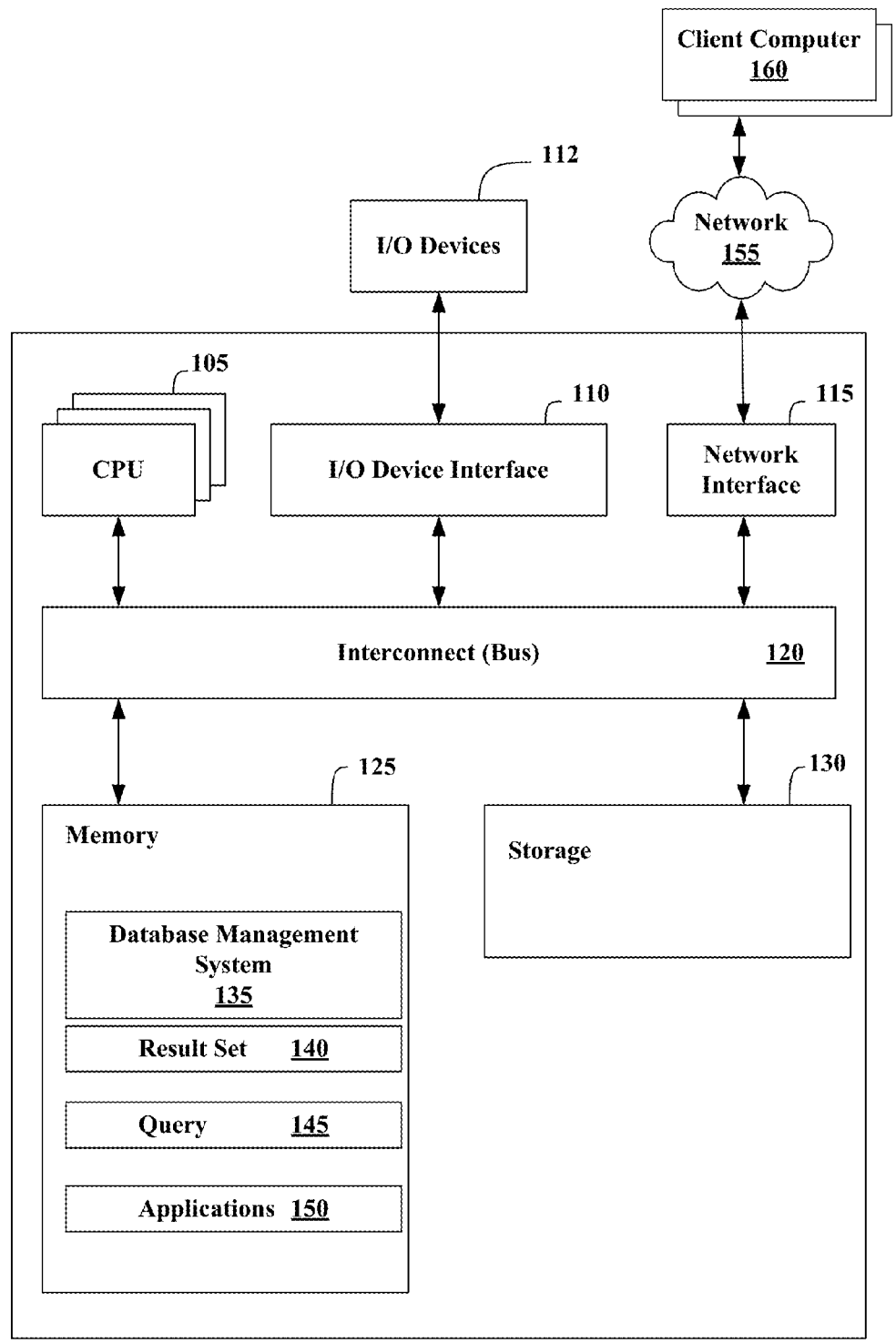
FIG. 1 illustrates an example representation of a computer system connected to a client computer via a network according to an embodiment.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
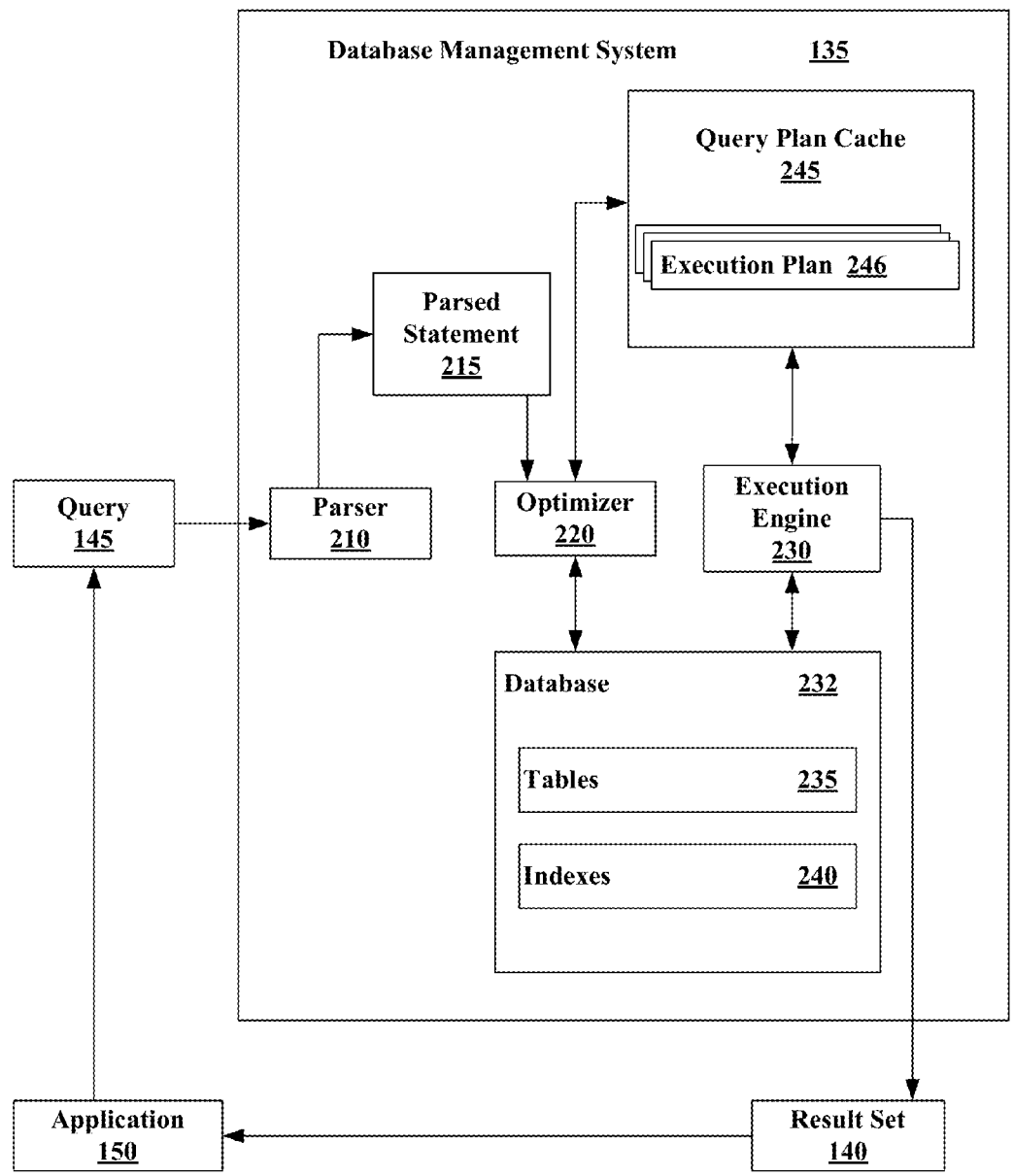
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
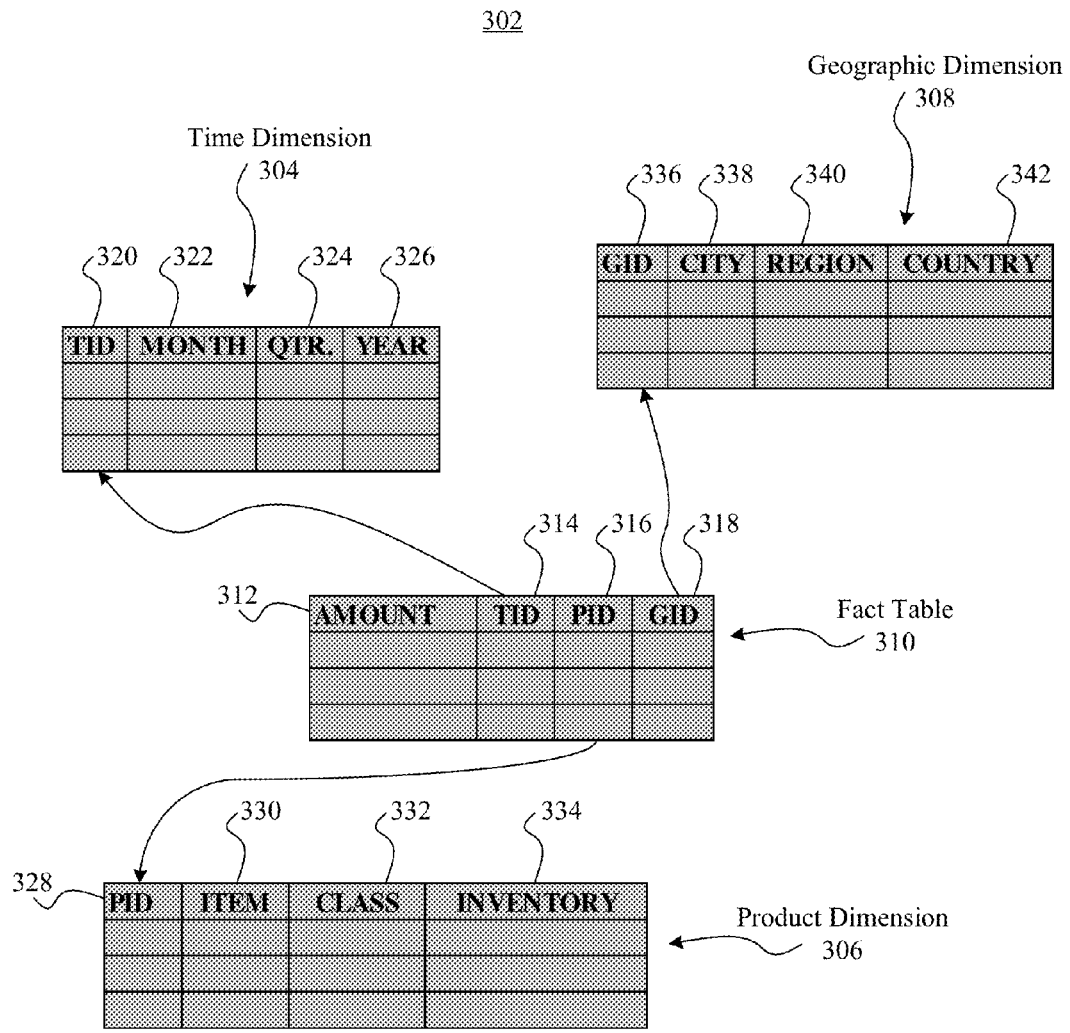
FIG. 3 illustrates a prior art example of a star schema with multiple dimension tables and a fact table.

FIG. 3 illustrates a prior art example of a star schema 302 with multiple dimension tables 304, 306, and 308 and a fact table 310. The fact table 310 includes sales data, wherein each record includes information on the amount sold in the AMOUNT column 312; a time identifier (TID) is included for the time of sale in the TID column 314; a product identifier (PID) is included for the product sold in the PID column 316; and a geographic identifier (GID) is included for the location of the sale, e.g., store location, in the GID column 318. The dimension tables 304, 306, and 308 provide attributes on the TID 314, PID 316, and GID 318 columns in the fact table.

The primary key columns of each of the dimension tables 304, 306, 308 are the TID column 320, PID column 328, and GID column 336, respectively. The columns 314, 316, and 318 in the fact table 310 are foreign keys that relate or correspond to primary keys 320, 328, and 336 of the dimension tables 304, 306, 308 that provide attributes on the data in the fact table 310. For instance dimension table 304 provides attributes for each possible TID value, including month information in column 322, quarter of the TID in the quarter column 324, and the year of the TID in the year column 326. Dimension table 306 provides product attributes for each PID value, including the product item in item column 330, the class of the product in the class column 332, and the inventory location of the product in inventory column 334. The dimension table 308 provides attributes for each possible GID value, including the city of the GID in the city column 338, the geographical region in the region column 340, and the country in the country column 342.

Figure 4:
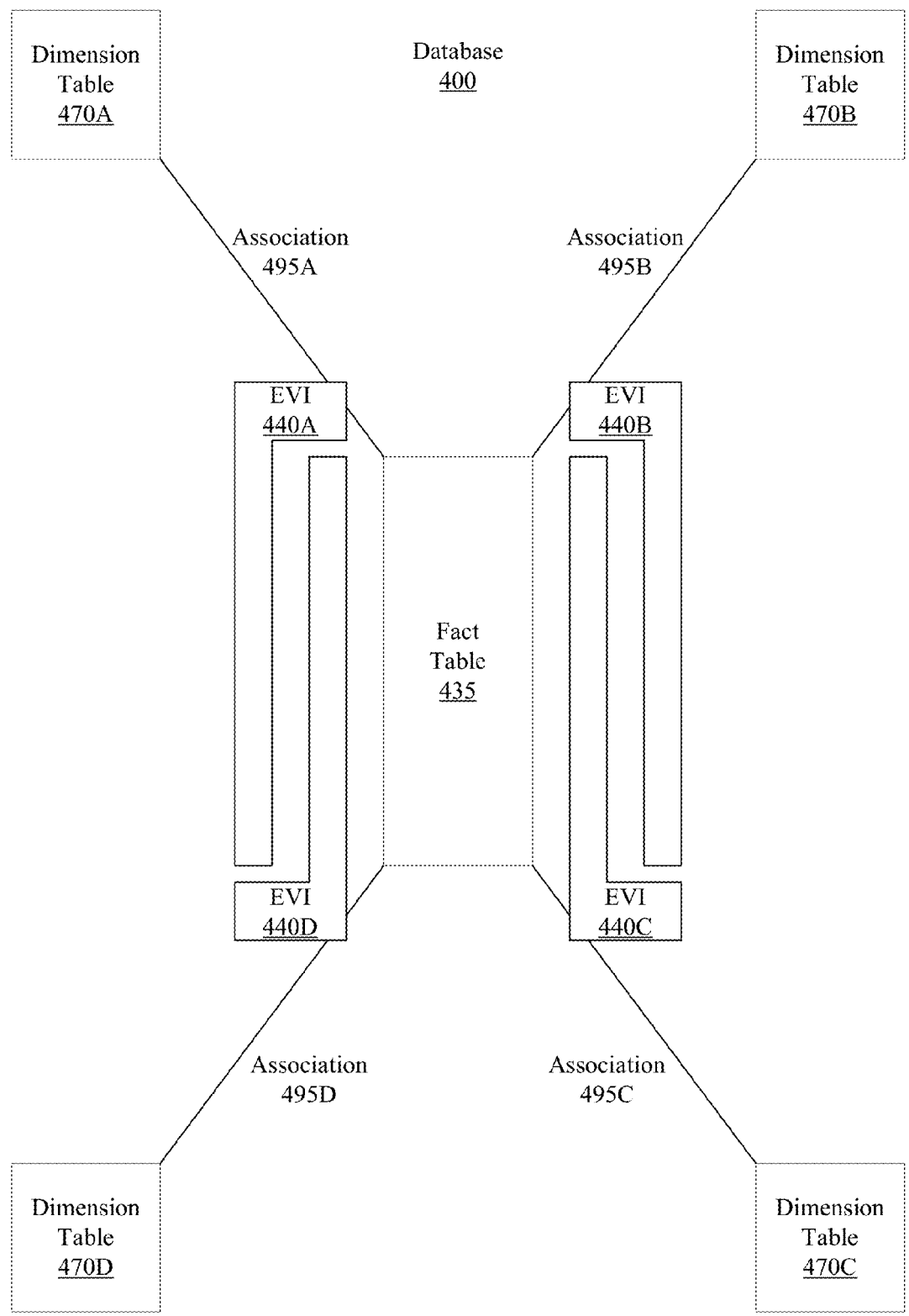
FIG. 4 illustrates a database according to an embodiment.

FIG. 4 illustrates a database 400 according to an embodiment. The database 400 may include a first table which may be a fact table 435. The fact table 435 may have a first key which may be a foreign key. The database 400 may include a second table which may be a dimension table 470. In embodiments, the dimension table 470 may be a significant distance from the fact table 435 or its indexes. The significant distance may be a geographic distance (e.g., different time zone) and may have latency implications (e.g., temporal delay). Multiple dimension tables are illustrated as 470A, 470B, 470C, 470D. Each dimension table 470 may have a second key which may be a primary key. Each foreign key of the fact table 435 may be related to the primary key of each dimension table 470.

An index 440 on the fact table 435 may exist. Multiple indexes are illustrated as encoded vector indexes (EVIs) 440A, 440B, 440C, 440D as an example. An EVI is a type of index providing access to a table by assigning codes to distinct key values. EVIs can be used to process large amounts of data efficiently because of their compact size and relative simplicity. The indexes 440 need not be EVIs, but may be EVIs in some embodiments.

An association 495, illustrated as associations 495A, 495B, 495C, 495D, may be maintained between the primary key of the dimension table 470 and aspects of the database 400 which may include at least one of the indexes 440 and the fact table 435. Maintaining the association 495 may include keeping updated an element in the index 440 with information pertaining to the second key of the dimension table 470. In embodiments, the association 495 may be of the significant distance between the dimension table 470 and the fact table 435 or the indexes 440. In embodiments, for example, the association 495A may be maintained between the primary key of the dimension table 470A and aspects of the index 440A. In embodiments, the association 495 may be maintained in response to maintenance to the dimension table 470. In embodiments, the association 495 may be maintained in response to a query 145 to the database 400. In embodiments, the association 495 may be maintained in response to a temporal element such as a certain time of day. In embodiments, the association 495 may be maintained in response to a refresh period such as a length of time since the association 495 was last maintained.

Figure 5:
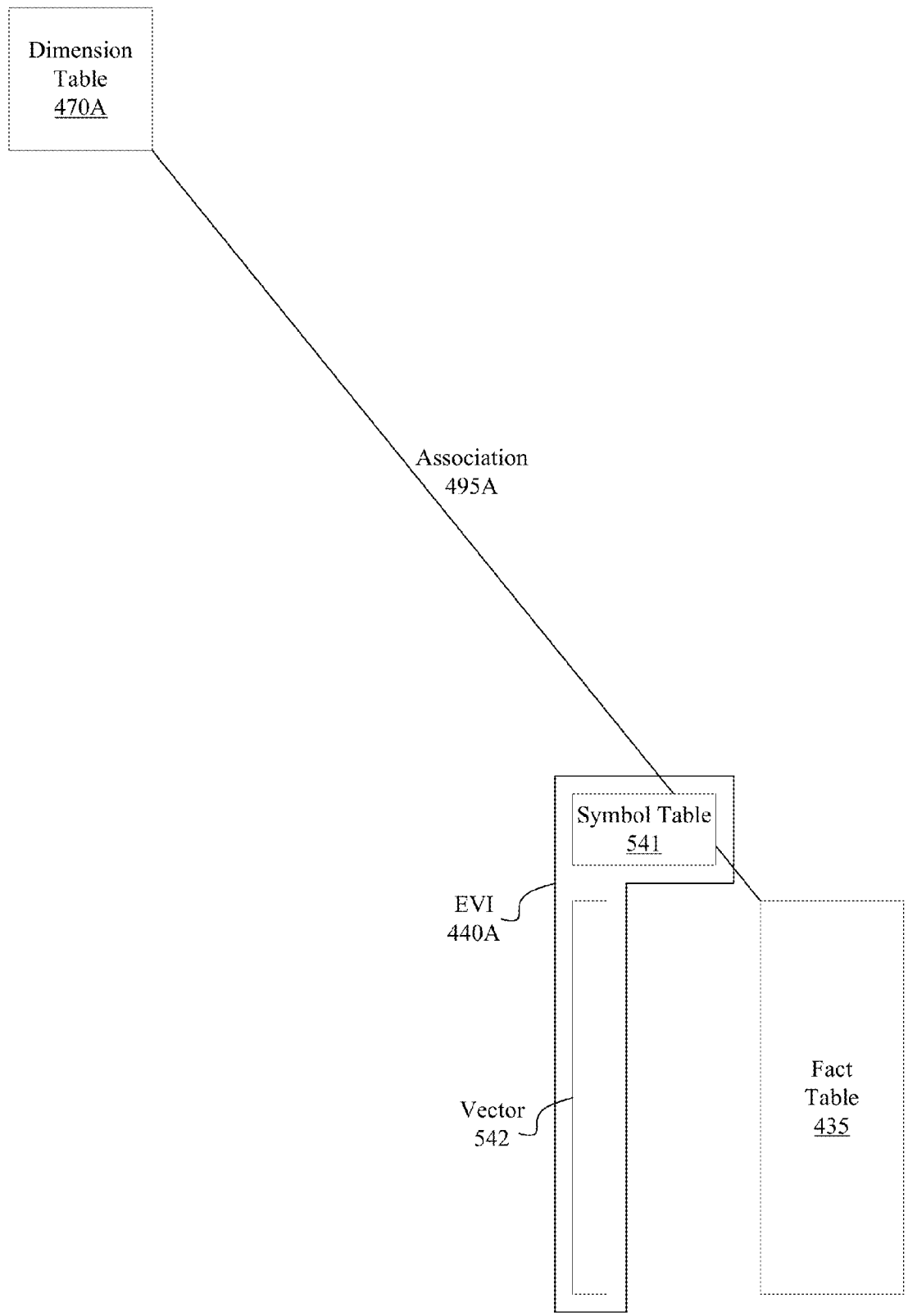
FIG. 5 illustrates an index according to an embodiment.

FIG. 5 illustrates the index 440A according to an embodiment. Aspects of FIG. 5 may be similar or the same as FIG. 4. EVI 440A may include a symbol table 541 and a vector 542. The vector 542 may contain a row for every record in the fact table 435 for which EVI 440A is an index. Each vector row corresponds to a fact table 435 record, and contains a code for the key value contained in the field of the fact table 435. The symbol table 541 may have a record for each particular key value that can be found for a field in the fact table 435 for which EVI 440A is an index. The symbol table 541 may include a translation from the particular key value to a code, as well as the count of how many records in the fact table 435 contain the key value. Using the code field, the symbol table 541 may be used to decode the vector 542.

Figure 6:
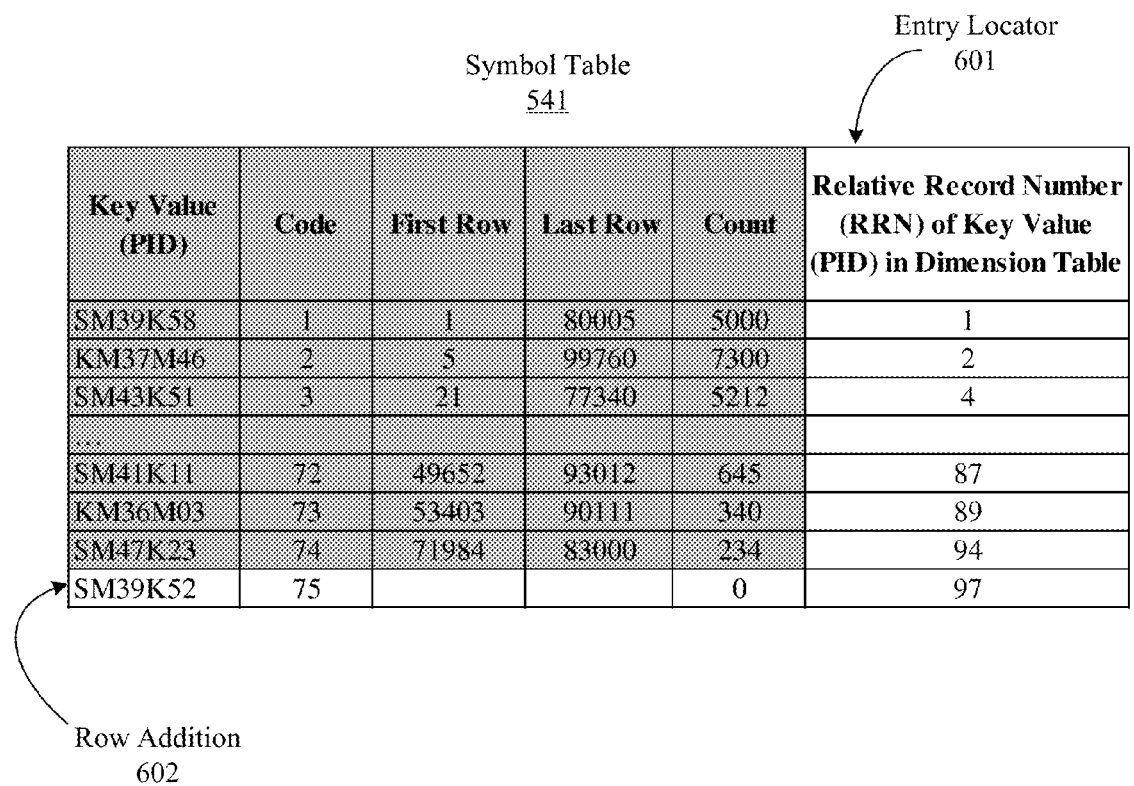
FIG. 6 illustrates a symbol table according to an embodiment.

FIG. 6 illustrates the symbol table 541 according to an embodiment. Aspects of FIG. 6 may be similar or the same as FIG. 4 and FIG. 5. Contents of the symbol table 541 are provided as an example. The key value may be a product identifier (PID). The code, the first row, the last row, and the count may be statistics similar to that described in relation to FIG. 5. In embodiments, the symbol table 541 may have an association with the primary key of the dimension table 470A.

The symbol table 541 may include an entry locator 601. In embodiments, the entry locator 601 may be elsewhere in the index that is EVI 440A. As part of the symbol table 541, the entry locator 601 may exist as a field or column. In embodiments, the entry locator may be created by deriving information related to the dimension table. In embodiments, the information related to the dimension table may be a relative record number (RRN).

The entry locator 601 may have the association 495 (see FIG. 4. and FIG. 5) with the primary key of the dimension table 470A. A particular association shown in FIG. 6 represents a relative record number (RRN) of the key value in the dimension table 470A. The primary key of the dimension table 470A may be a significant distance from the entry locator 601. In embodiments, the association may be maintained in response to maintenance to the dimension table 470A. The association between the primary key of the dimension table 470A and the entry locator 601 may include flow from the dimension table 470A to the entry locator 601. Flow may include at least one of a broadcast, communication, connection, conveyance, correspondence, message, publication, and transmission. The flow may be in response to maintenance (e.g., addition, deletion, change) on the dimension table 470A. Other embodiments are contemplated, including but not limited to the association being maintained in response to a query 145 to the database 400.

At least one of the entry locator 601 and maintaining the association 495 may save system resources or enhance efficiency. Without the entry locator 601 and maintaining the association 495, a task such as adding a new product to the fact table 435 may require the fact table 435 or one of its indexes 440 to effectively reach out across the significant distance to the dimension table 470 for data that then may need to be sent back across the significant distance to the the fact table 435 or one of its indexes 440. The significant distance in that scenario may have latency implications. A substantial cost in resources or efficiency can incur for information traveling the significant distance to and from, for example, the fact table 435 of a sales kiosk of a store and, for example, the dimension table 470A of a cloud-based server when the significant distance separates the sales kiosk from the cloud-based server by a time-zone. On the other hand, with at least one of the entry locator 601 and maintaining the association 495, the significant distance may be traveled fewer times, at more efficient times, etc. For example, information may travel from the dimension table 470 to the index 440 at a certain time of day, when information in the dimension table 470 changes, etc. Thus, aspects of the disclosure may reduce potential negative impacts due to latency time over the significant distance. In the foregoing, when the sales kiosk reaches for the information it need only look to the entry locator 601 which may be in the symbol table 541 in the EVI 440A. Such information may be at the sales kiosk or in the store. The cloud-based server the time zone away may or may not need to be involved in as many instances.

For example as represented in FIG. 6, key value "SM39K58," which may be the product identifier (PID) for a seed corn hybrid, has "1" for the entry locator 601. Thus, the PID "SM39K58" may be in RRN "1" of the dimension table 470A (which may include attributes of specific seed corn hybrids) having a primary key PID. A task (e.g., add new product), query, or modification associated with the fact table 435 (e.g., sales transactions) related to EVI 440A may or may not then need to interact with the dimension table 470A. In particular, the case of not interacting with the dimension table 470A may save system resources or enhance efficiency.

Row addition 602 of the symbol table 541 represents in the symbol table 541 a distinct value of an example new row. In embodiments, the example new row may have been added to the dimension table 470A in RRN "97" with a PID "SM39K52" for the distinct value of a new seed corn hybrid for an upcoming planting season. Including row addition 602 is an update to the symbol table 541 which may occur before a user (e.g., seed corn salesman) of the fact table 435 attempts to use the distinct value "SM39K52" for the PID. In embodiments, the distinct value of the new seed corn hybrid with the PID "SM39K52" may be added to the symbol table 541. The symbol table 541 may indirectly check for uniqueness. If "SM39K52" already existed in the symbol table 541, an error may be sent to an application or the user attempting to insert a duplicate key. Even though the current count for the distinct value in the row addition 602 is "0," the row addition 602 is ready for use by the fact table 435 or a query 145 and may or may not need to interact with the dimension table 470A upon such requested use by the fact table 435 or the query 145. The result may include a cost savings in forms of saved system resources, enhanced efficiency, etc.

Figure 7:
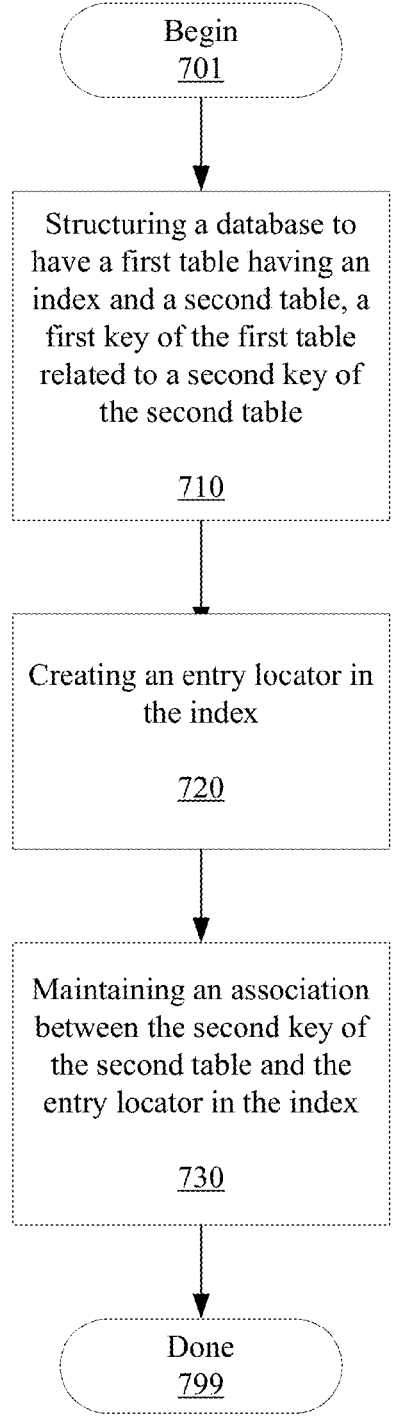
FIG. 7 is a flowchart illustrating an operation to manage a database according to an embodiment.

FIG. 7 is a flowchart illustrating an operation 700 to manage a database according to an embodiment. The operation 700 may manage a database. The operation 700 may begin at block 701. The database may be structured to have a first table having an index and a second table at block 710. The first table may be a fact table. The index may be an encoded vector index. The second table may be a dimension table. The first table may have a first key. The first key may be a foreign key. The first key of the first table may be related to a second key of the second table. The first key may correspond to the second key. The second key may be a primary key.

An entry locator may be created in the index at block 720. The entry locator may be a column of a symbol table. In embodiments, the entry locator may be created by deriving information related to the second table. In embodiments, the information related to the second table may be a relative record number.

An association between the second key of the second table and the entry locator in the index may be maintained at block 730. Maintaining the association between the second key of the second table and the entry locator in the index may include keeping updated the entry locator in the index with information pertaining to the second key of the second table. Put differently, maintaining the association between the primary key of the second table and the entry locator of the index may keep the entry locator updated. The association between the second key and the entry locator may be maintained in response to maintenance to the second table. Maintenance to the second table may include at least one of an addition, a deletion, and a change. The association between the second key and the entry locator may be maintained in response to a query to the database.

The operation may conclude at block 799. Aspects of the operation 700 may save system resources. Less paging of objects may occur. The second table may or may not need to be checked regarding the second key and a change may be made directly to the first table. Fewer indexes may be created and fewer indexes may need to be maintained. A task may be efficient or perform well because of fewer indexes needing to be accessed for the task. In addition to embodiments described above, other embodiments having fewer operational steps, more operational steps, or different operational steps are contemplated. Also, some embodiments may perform some or all of the above operational steps in a different order.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system comprising:
one or more processors; and
a memory coupled to the one or more processors, the memory having program code embodied therewith, the program code configured such that when executed by the one or more processors the program code causes the one or more processors to perform a method comprising:
   accessing an encoded vector index (EVI) for a fact table, wherein the EVI includes:
      a symbol table for indicating which code values are assigned to which key values in the fact table;
      a vector having a plurality of rows corresponding in a one-to-one relationship with a second plurality of rows in the fact table whereby, for each row of the plurality of rows in the vector, a code value located in the row serves to indicate that a key value to which the code value is assigned is located in a corresponding row of the second plurality of rows in the fact table; and
      an entry locator for indicating, for each key value in the fact table, which row of a third plurality of rows in a dimension table has a primary key value that corresponds with the key value in the fact table, wherein the entry locator is a column of the symbol table;
   selecting a key value in the fact table;
   using the symbol table to identify a specific code value assigned to the selected key value;
   identifying at least one row of the second plurality of rows in the fact table as having the selected key value by searching for rows of the first plurality of rows in the vector having the specific code value;

using the entry locator to identify at least one row of the third plurality of rows in the dimension table as having a primary key value corresponding with the selected key value; and wherein relative record numbers for rows of the third plurality of rows in the dimension table are listed in the column of the symbol table, wherein the key values in the fact table are listed in a second column of the symbol table, and wherein each row of a fourth plurality of rows in the symbol table includes a relative record number and a one key value in the fact table whereby the relative record number indicates that a primary key value in the dimension table corresponding to the one key value in the fact table is located in a row of the third plurality of rows in the dimension table that corresponds with the relative record number.

2. A system comprising:

one or more processors; and a memory coupled to the one or more processors, the memory having program code embodied therewith, the program code configured such that when executed by the one or more processors the program code causes the one or more processors to perform a method comprising:

structuring a database to have a fact table having an encoded vector index and a dimension table, a foreign key of the fact table related to a primary key of the dimension table;

creating an entry locator in the encoded vector index; and maintaining an association between the primary key of the dimension table and the entry locator in the encoded vector index in response to at least one of a maintenance to the dimension table, a query to the database, a temporal element, and a refresh period, wherein the encoded vector index further comprises:

a symbol table for indicating which code values are assigned to which key values of the foreign key of the fact table;

a vector having a plurality of rows corresponding in a one-to-one relationship with a second plurality of rows in the fact table whereby, for each row of the plurality of rows in the vector, a code value located in the row serves to indicate that a key value of the foreign key to which the code value is assigned is located in a corresponding row of the second plurality of rows in the fact table; and wherein the entry locator includes a column of the symbol table and indicates, for each key value of the foreign key, which row of a third plurality of rows in the dimension table has a key value of the primary key that corresponds with the key value of the foreign key.

3. The system of claim 2, wherein the column of the symbol table includes a relative record number pertaining to the primary key of the dimension table.

\* \* \* \* \*